(12) United States Patent  
Fondriest

(10) Patent No.: US 6,974,108 B2  
(45) Date of Patent: Dec. 13, 2005

(54) LOWER BEARING FOR AIRCRAFT LANDING GEAR

(76) Inventor: William Fondriest, 1270 Biscayne Blvd., Suite 4, Deland, FL (US) 32724

( * ) Notice: Subject to any disclaimer, the term of this patent is extended or adjusted under 35 U.S.C. 154(b) by 0 days.

(21) Appl. No.: 10/728,424

(22) Filed: Dec. 4, 2003

(65) Prior Publication Data

US 2005/0133663 A1 Jun. 23, 2005

(51) Int. Cl.[7] .......................... B64C 25/10; F16C 33/74
(52) U.S. Cl. .............................. 244/102 R; 244/102 A; 384/145; 384/146; 384/296
(58) Field of Search ........................ 244/102 R, 102 A, 244/100 R; 384/145, 146, 273, 276, 290, 384/296

(56) References Cited

U.S. PATENT DOCUMENTS

| | | | | |
|---|---|---|---|---|
| 4,616,387 A | * | 10/1986 | Smith, Jr. ................ | 29/898.05 |
| 4,848,934 A | * | 7/1989 | Blakely et al. ............. | 384/206 |
| 4,909,638 A | * | 3/1990 | Muto ........................ | 384/273 |
| 5,009,522 A | * | 4/1991 | Hahn ......................... | 384/288 |
| 6,241,052 B1 | * | 6/2001 | Berwanger ................. | 188/71.5 |
| 2003/0160606 A1 | * | 8/2003 | Babin et al. ............. | 324/207.2 |

* cited by examiner

Primary Examiner—J. Woodrow Eldred
(74) Attorney, Agent, or Firm—Mark D. Bowen, Esq.; Stearns Weaver Miller Weissler Alhadeff & Sitterson, P.A.

(57) ABSTRACT

An improved split bearing for use with an aircraft landing gear assembly is disclosed. The split bearing includes first and second semi-cylindrical sleeve components adapted for installation in surrounding relation with the piston tube of a hydraulically actuated landing gear system of an aircraft. A retaining flange secures the split-bearing sleeve components and is adapted for assembly into an integral and complete nose gear lower bearing that allows removal of the main wear component without complete disassembly of the nose gear. A preferred embodiment disclosed herein is particularly adapted for use on an Embraer™ Emb120 turbo propeller aircraft. The nose gear lower bearing disclosed herein is designed to allow aircraft technicians the ability to quickly change the main wear portion of the lower bearing without the need to discharge, remove and/or disassemble the nose gear from the aircraft.

7 Claims, 4 Drawing Sheets

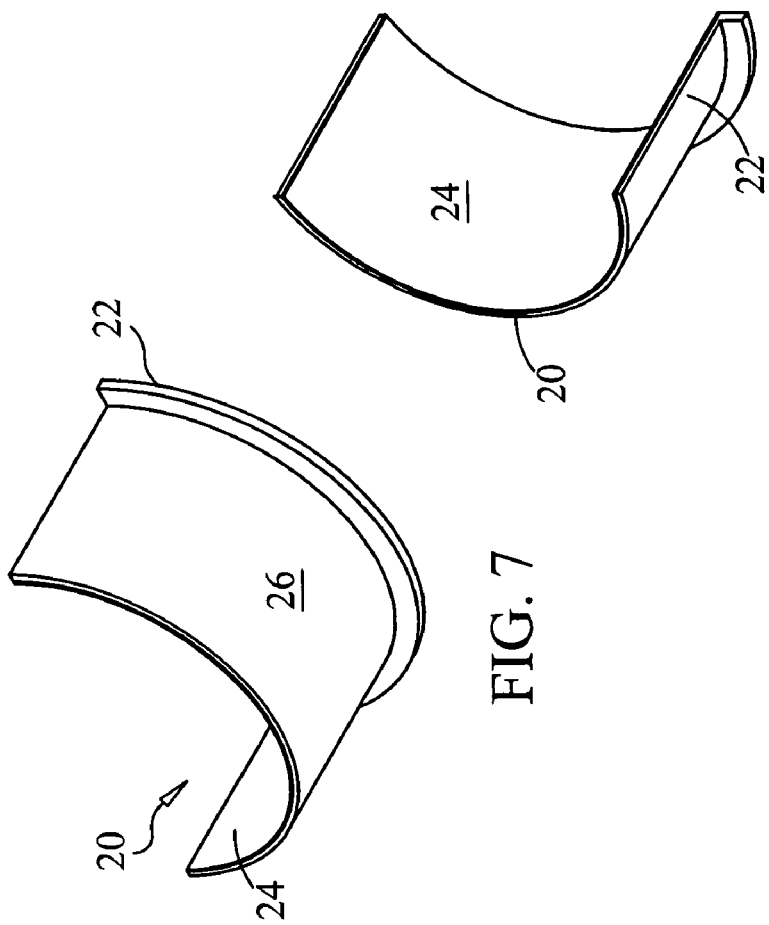
FIG. 8
FIG. 7
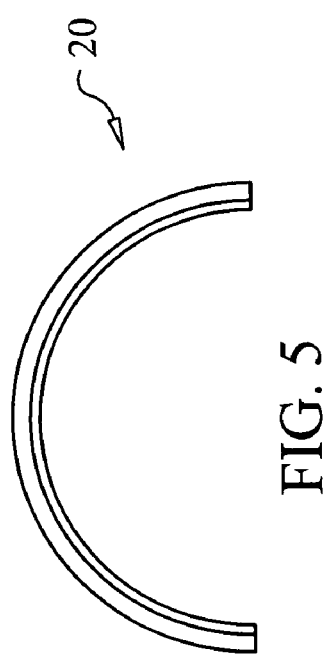
FIG. 5
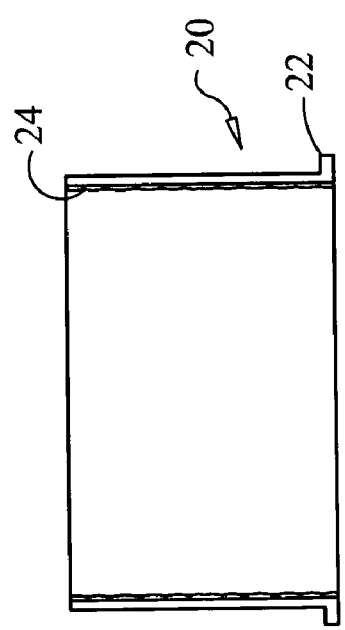
FIG. 6

LOWER BEARING FOR AIRCRAFT LANDING GEAR

CROSS REFERENCE TO RELATED APPLICATIONS

N/A

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

The present invention relates to landing gear systems used on commercial aircraft, and more particularly to an improved lower bearing assembly for the nose gear of an aircraft that provides improved wear resistance and is adapted for simple and quick replacement without requiring the aircraft to be taken out of service for extensive maintenance.

2. Description of the Background Art

The aviation industry is divided into two major providers, major air carriers and regional air carriers. The major carriers operate larger jet aircraft that are capable of transporting passengers over greater distances. These aircraft are routinely used both in intercontinental and trans-oceanic operations. The regional carriers typically provide point-to-point service on shorter routes and feeder service to their major air carrier partners through the hub and spoke transportation method. This service is accomplished through the use of smaller turbo propeller aircraft, normally ranging in size between 30 and 50 passengers.

With the increased demand on air carriers to provide more point-to-point service while improving on-time performance, the regional carriers have flourished through partnerships with major air carriers. As a result, many major carriers have signed long term contracts with regional partners on a fee per departure basis which guarantees the regional operator a fixed price every time the aircraft leaves the gate, regardless of the number of passengers actually onboard the aircraft.

The major carriers handle all of the reservation services and advertising, with the regional carriers aircraft painted to look like those of their major carrier partners. The only responsibility the regional carrier has is to make sure that the aircraft leaves the gate on time. For this their costs for operating the aircraft are covered and they are given an agreed upon profit margin, and the major carrier is responsible for filling the seats. Therefore, it has become ever more important to make sure that aircraft operated by regional carriers are capable of departing on schedule in an airworthy manner. Conversely, when the aircraft are unable to perform, the regional carrier looses money.

Most regional aircraft are designed with tricycle landing gear configuration, wherein the aircraft is equipped with a front-end or nose landing gear assembly and left and right main landing gear assemblies disposed rearward of the nose gear. During the operation of the aircraft, more specifically during take off, landing and taxiing the nose gear is subjected to loads that cause the lower bearing to become worn and loose. As depicted in FIG. 10, prior art landing gear assemblies incorporate one piece lower bearings constructed from one solid piece of 2024 T4 aluminum, a scraper ring, and an inner liner of material identified as Delrin™. The scraper ring is rubber with a metal backing for rigidity and installs into a machined mounting flange at one end of the lower bearing. The Delrin™ liner is cylindrical and split, to facilitate installation, and is inserted into the inner diameter of the lower bearing. The lower bearing is cylindrical in shape with a 90 degree retaining boss at one end with three mounting holes for bolts. This mounting flange houses the aforementioned scraper ring. The body of the lower bearing which is cylindrical in nature houses the Delrin™ liner. The aluminum lower bearing is anodized to prevent corrosion and the retaining flange is painted with a two part polyurethane paint to match that of the landing gear.

The lower bearing is installed over the outer diameter of the nose gear piston tube and into the inner diameter of the nose gear turning tube (driver). Once in this position the lower bearing is attached to the driver via three bolts that transverse through the 90 degree retaining boss and screw into corresponding threaded recesses on the driver. The inner diameter of the lower bearing has the Delrin™ segment installed and this acts as a sacrificial wear surface that comes in direct contact with the chromium finish on the outer diameter of the piston tube.

As the piston tube moves in and out of the upper bearing along its vertical axis the Delrin™ segment becomes worn. At some point, if not replaced, the Delrin™ segment can become completely worn through, leaving the chromium finish on the outer dimension of the piston tube to come in direct contact with the aluminum lower bearing. This event can cause damage to the chromium finish and can allow chromium particles to migrate up the piston tube and come in contact with the inner seal causing the nose gear to loose fluid and eventually fail.

To replace the worn or damaged lower bearing and/or the Delrin™ segment the aircraft must be brought into the hangar, elevated onto jacks and the nose gear disassembled. In order to remove the lower bearing, the nose gear must be removed from the aircraft so that a technician can gain full access to all of its components. The removal and disassembly of the nose gear can take between 6 and 8 hours with an experience crew of technicians. Once the old lower bearing was removed and a new bearing assembly is installed, the nose gear must be reassembled, tested, and finally installed on the aircraft. Once installed, final calibration and servicing of the strut is required causing additional delays. In total, an aircraft needing this type of repair would certainly be out of service for one complete day.

Accordingly, there is a need for a lower bearing that is more reliable and easier to maintain and/or replace. The lower bearing should be designed in such a manner that it provides better wear resistance characteristics and easier replacement of the main wear component. This main wear component should be able to be replaced without disassembly of the nose landing gear. The lower bearing should be designed in such a manner as to allow a technician the ability to remove and replace the main wear component while the aircraft is still located at the gate without having to raise the aircraft and/or remove the nose gear from the aircraft. It should be a process that can be accomplished in a matter of minutes, alleviating the necessity to take the aircraft back to the hangar for extensive maintenance and the cancellation of flights.

SUMMARY OF THE INVENTION

To achieve these advantages and in accordance with the purpose of the invention, as embodied and broadly described, the present invention comprises an improved lower bearing for use with an aircraft landing gear assembly. The invention comprises four components adapted for assembly into an integral and complete nose gear lower bearing that allows removal of the main wear component without complete disassembly of the nose gear. A preferred embodiment disclosed herein is particularly adapted for use on an Embraer™ Emb120 turbo propeller aircraft. The nose gear lower bearing disclosed herein is designed to allow aircraft technicians the ability to quickly change the main wear portion of the lower bearing without the need to discharge, remove and/or disassemble the nose gear from the aircraft. More specifically, the present invention incorporates a lower bearing made up of four individual pieces, which when assembled together comprise a complete nose gear lower bearing.

Accordingly, it is an object of the present invention to improve the performance and reliability of aircraft.

Still another object of the present invention is to provide an improved aircraft landing gear assembly.

Yet another object of the present invention is to provide a lower bearing for an aircraft landing gear assembly that is adapted for rapid replacement.

In accordance with these and other objects that will become apparent hereinafter, the instant invention will now be described with particular reference to the accompanying drawings.

BRIEF DESCRIPTION OF THE SEVERAL VIEWS OF THE DRAWINGS

The accompanying drawings are included to provide a further understanding of the invention and are incorporated in and constitute apart of this specification, illustrate several embodiments of the invention and together with the description serve to explain the principles of the invention.

FIG. 5 is a top plan view of one split bearing component;

FIG. 6 is a side view thereof;

FIG. 7 is an outer perspective view thereof;

FIG. 8 is an inner perspective view thereof;

DETAILED DESCRIPTION OF THE INVENTION

Figure 3:
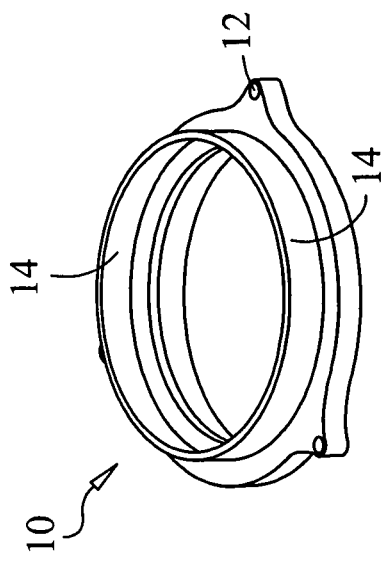
FIG. 3 is a bottom perspective thereof.
Figure 4:
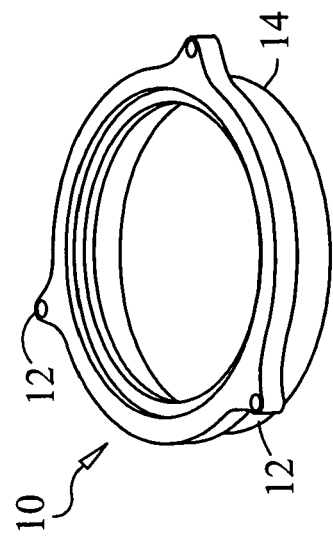
FIG. 4 is a top perspective view thereof.
Figure 1:
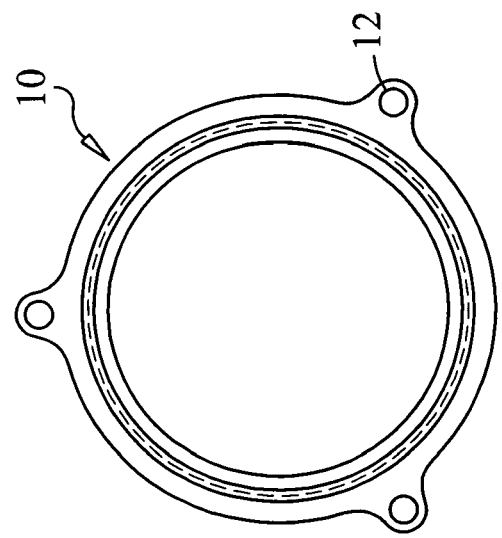
FIG. 1 is a bottom plan view of a retaining flange for securing a split bearing according to the present invention through the use of three bolts fastened to the turning tube (driver) of the landing gear assembly.
Figure 2:
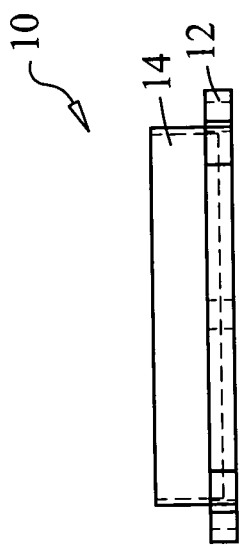
FIG. 2 is a side view thereof.
Figure 9:
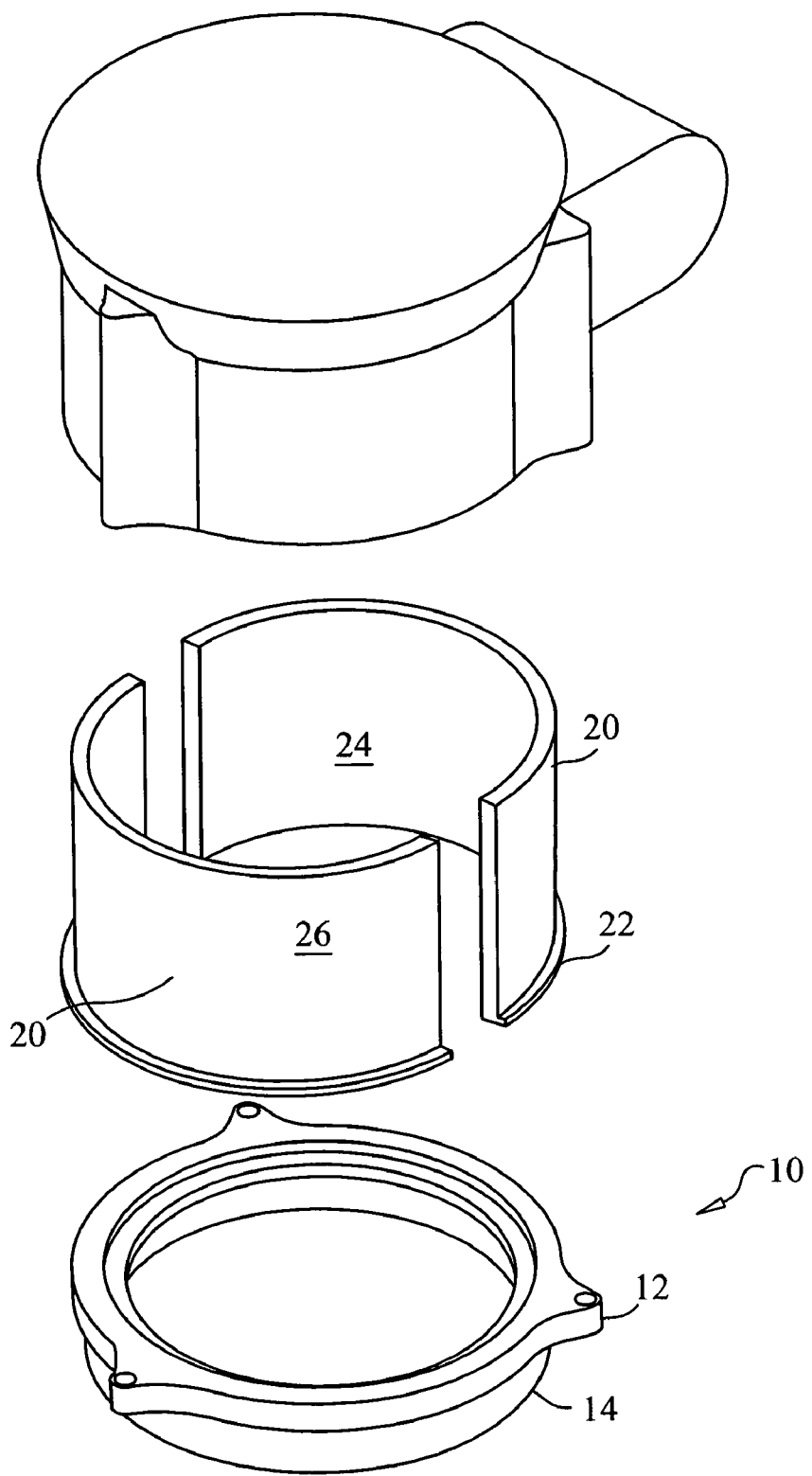
FIG. 9 is an exploded perspective view of the retaining flange and split bearing assembly.
Figure 10:
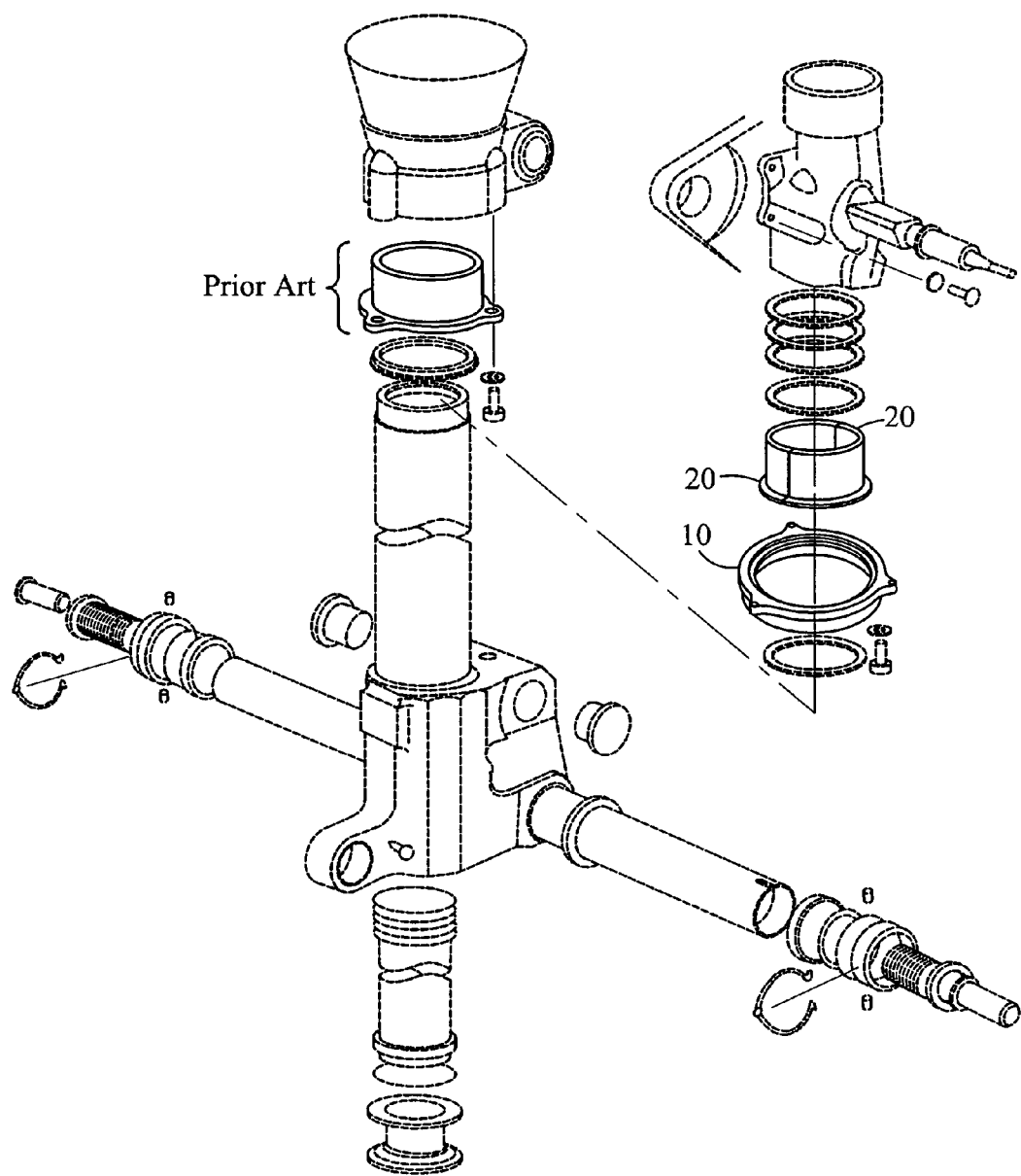
FIG. 10 is an exploded perspective view illustrating the relationship between the piston tube, the lower bearing and the turning tube (driver), with a prior art lower bearing shown in line with the piston tube, and the bearing illustrated to the right of the piston tube is an example of the bearing according to the preferred embodiment of the present invention.

Turning first to FIG. 10, there is depicted a prior art single piece bearing, referenced as 100. As seen in FIG. 10, the prior art bearing comprises a single unit having a sleeve portion 102 that slides over a cylindrical piston tube on the landing gear assembly of an aircraft. As noted hereinabove, sleeve 102 of the prior art single piece bearing 100 includes an inner liner fabricated of a sacrificial material identified as Delrin™ that comes in direct contact with the chromium finish on the outer diameter of the piston tube. As the piston tube moves in and out of the upper bearing along its vertical axis the inner liner becomes worn. At some point, if not replaced, the inner liner segment can become completely worn through, exposing the chromium finish on the outer surface of the piston tube to come in direct contact with the inner surface of the aluminum lower bearing. Such excessive wear can cause damage to the chromium finish and result in chromium particles coming in contact with the piston inner seal causing the nose gear to loose fluid and eventually fail.

With reference now to a preferred embodiment of the present invention, FIGS. 1–10 depict an improved three piece lower bearing for aircraft landing gear assemblies, including a retaining flange 10 and a split bearing having identical first and second arcuate split bearing sleeve components, each of which is referenced as 20. Each arcuate sleeve component comprises a generally semi-cylindrical sleeve having a cylindrical wall extending approximately 180 degrees, e.g. a half-cylinder. Each arcuate sleeve component is preferably fabricated from 17-4 stainless steel and cadmium plated, to identical dimensions and tolerances. The improved bearing functions as the main wear component of the lower bearing and is comprised of two arcuate split bearing sleeve halves 20, which form a cylinder when configured in generally abutting engagement and installed on the inner diameter of the turning tube (driver) as depicted in FIG. 10. Each arcuate sleeve component 20 is preferably fabricated from 17-4 PH stainless steel, however any suitable material is considered within the scope of the present invention. Each arcuate sleeve component includes a beveled inner top peripheral edge and a lower radially outwardly projecting boss 22 that functions as a stop when the split bearing is installed into the turning tube (driver). More particularly, projecting boss 22 prevents the split bearing from moving along the axial plane as the piston tube cycles during take off, landing and taxiing. For quality assurance, each arcuate sleeve component 20 preferably is part of a matched set, and each set of components are marked with identical serial numbers to better prevent mismatching components.

In addition, each arcuate split bearing component 20 has an inner cylindrical surface having an inner coating 24 of a self-lubricating material having a thickness between 0.010–0.015 inches. In a preferred embodiment, the self-lubricating material comprises a homogenous composite matrix of a polyester resin base with polytetrafluorethylene (PTFE) similar or equivalent to the material identified by the trademark Karon™ available from Kamatics corporation. In a preferred embodiment, inner coating 24 is applied by a coating process that results in the inner surface of each bearing sleeve component having a coating of self-lubricating material with a low coefficient of friction to provide improved wear performance. It is contemplated, however, that a liner may be pre-formed by fabricating a cylindrical liner piece by injection molding and adhesively fixing a fabricated piece to the inner surface of each arcuate split bearing sleeve 20. When installed on the landing gear assembly, the split bearing sleeves and particularly inner liner 24 functions as the main wear component of the lower bearing due to direct contact with the chromium surface on the outer diameter of the hydraulic piston tube. The selection and use of Karon™ for the inner liner 24 provides significant advantages over the use of Delrin™ as found in the prior art bearing. More particularly, Karon™ has a lower coefficient of friction than Delrin™ and is much denser allowing for improved wear characteristics.

The split bearing components are kept into position by retaining flange 10, which is preferably made of 2024 T4 aluminum. As best depicted in FIGS. 1–4, flange 10 includes an annular body having three radially projecting structures, referenced as 12. Each radially projecting structure 12 on flange 10 defines a thru bore for receiving a threaded fastener. The top end of retaining flange 10 defines an annular recessed portion 16 that receives radially projecting boss 22 of components 20 when installed in mating engagement with components 20. The other side of the retaining flange has a groove machined for the acceptance of a scraper ring referenced as 30. The scraper ring is glued into place and comes in direct contact with the chromium finish on the outer diameter of the piston tube. Since the scraper ring is rubber, it does not damage the chromium surface, but instead wipes it, similar to a windshield wiper, cleaning off any fluids and/or debris.

When installed properly, the split bearing is inserted into the inner diameter of the turning tube (driver) and prevented from migrating further inside the driver by the 90 degree boss. Then, the retaining flange is installed over the split bearing and secured in position by three bolts that hold it in place through the corresponding three retaining flanges.

It is recognized that the split bearing must be replaced periodically due to wear. A significant aspect of the present invention relates to the ability of a technician to rapidly replace the bearing. More particularly, in order to replace the bearing, the technician must only remove the three bolts holding the retaining flange in position, lower the retaining flange down the piston tube and then remove the worn split bearing by removing each of the two arcuate bearing components 20. Once this has been accomplished, two new split bearing components 20 may be installed, and secured by merely moving retaining flange 10 back up the piston tube and securing the assembly in place using three bolts. Significantly, at no time does the aircraft need to be lifted in the air, nor does the nose gear need to be removed and/or disassembled as is required with the prior art bearing.

The instant invention has been shown and described herein in what is considered to be the most practical and preferred embodiment. It is recognized, however, that departures may be made therefrom within the scope of the invention and that obvious structural and/or functional modifications will occur to a person skilled in the art.

I claim:

1. A lower bearing assembly adapted for installation on the hydraulically actuated landing gear system of an aircraft, said lower bearing assembly having a longitudinally axis and comprising:
   a split bearing including first and second arcuate components adapted for mating engagement to form a generally cylindrical bearing;
      said first and second arcuate components each including a longitudinally lower portion defining a radially outwardly projecting boss;
   a generally annular retaining flange having in a longitudinally upper portion an annular recessed portion adapted to receive said projecting boss of each of said first and second components so as to retain said first and second arcuate components.

2. A lower bearing assembly according to claim 1, wherein each of said first and second arcuate components each define an inner semi-cylindrical surface having a coating of self-lubricating material.

3. A lower bearing assembly according to claim 2, wherein said self-lubricating material comprises a polyester resin base including polytetrafluorethylene.

4. A lower bearing assembly adapted for installation on the hydraulically actuated landing gear system of an aircraft, said lower bearing assembly having a longitudinal axis comprising:
   a split bearing including first and second arcuate sleeve components adapted for mating engagement to form a generally cylindrical bearing sleeve, each of said arcuate components including a semi-cylindrical inner surface and a bottom longitudinal portion;
   each bottom portion including a radially outwardly projecting boss;
   a generally annular retaining flange having a longitudinal portion defining an annular groove adapted to retain said first and second arcuate components by receiving the bottom portions thereof such that said projecting boss each of said first and second arcuate components is received in mating engagement with said annular groove.

5. A lower bearing assembly according to claim 4, wherein the inner semi-cylindrical surfaces of each of said first and second arcuate sleeve components includes a coating of material having a low coefficient of friction.

6. A lower bearing assembly according to claim 5, wherein said material having a low coefficient of friction includes a polyester resin base and polytetrafluorethylene.

7. A lower bearing assembly according to claim 4, wherein said retaining flange further includes a lower portion defining an annular groove and a scrapper ring received within said lower portion annular groove.

* * * * *